United States Patent
Bedrossian (10) Patent No.: US 10,132,828 B2
(45) Date of Patent: Nov. 20, 2018

(54) ACCELERATION PREDICTOR

(71) Applicant: HALLIBURTON ENERGY SERVICES, INC., Houston, TX (US)

(72) Inventor: Nazareth Sarkis Bedrossian, Dickinson, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 96 days.

(21) Appl. No.: 15/302,451

(22) PCT Filed: Sep. 2, 2014

(86) PCT No.: PCT/US2014/053718
§ 371 (c)(1),
(2) Date: Oct. 6, 2016

(87) PCT Pub. No.: WO2016/036349
PCT Pub. Date: Mar. 10, 2016

(65) Prior Publication Data
US 2017/0023607 A1 Jan. 26, 2017

(51) Int. Cl.
*G06F 19/00* (2018.01)
*G01P 15/16* (2013.01)
*E21B 31/107* (2006.01)
*E21B 47/00* (2012.01)

(52) U.S. Cl.
CPC ............ *G01P 15/16* (2013.01); *E21B 31/107* (2013.01); *E21B 47/00* (2013.01); *E21B 47/0006* (2013.01)

(58) Field of Classification Search
CPC ......... G01S 13/878; G01S 19/52; G01P 15/18
USPC .................................... 702/6, 7, 8, 182–185
See application file for complete search history.

(56) References Cited

U.S. PATENT DOCUMENTS

| | | | |
|---|---|---|---|
| 4,545,242 | A | 10/1985 | Chan |
| 5,375,064 | A | 12/1994 | Bollinger et al. |
| 7,849,449 | B2 | 12/2010 | Andrade et al. |
| 2005/0284663 | A1 | 12/2005 | Hall et al. |
| 2011/0276305 | A1* | 11/2011 | Rinnan .................. B63B 39/00 702/141 |
| 2012/0123757 | A1 | 5/2012 | Ertas et al. |

FOREIGN PATENT DOCUMENTS

| | | |
|---|---|---|
| CA | 2316903 | 1/2000 |
| CN | 103775077 | 5/2014 |
| EP | 0361996 | 4/1990 |

(Continued)

OTHER PUBLICATIONS

Rhee, PCT Written Opinion for PCT Application No. PCT/US14/53718 dated May 18, 2015.

(Continued)

*Primary Examiner* — Edward Raymond
(74) *Attorney, Agent, or Firm* — Locke Lord LLP (57) ABSTRACT

An acceleration predictor and method including at least one digital smoothing filter capable of calculating at least one acceleration estimate. In one or more embodiments, the estimator may include an overlay, an acceleration heat map, at least one threshold, wherein each acceleration heat map covers a range of a plurality of tool string components, a scroll bar, visual indications that may be color coded, or a maximum acceleration value.

18 Claims, 5 Drawing Sheets

(56) References Cited

FOREIGN PATENT DOCUMENTS

WO    2010064031    6/2010

OTHER PUBLICATIONS

J-K Wang, M. S. Kalsi, Kalsi Engineering, R. A. Chapelle, SPE, and T. R. Beasley, Dailey Petroleum Services Corp., "A Practical Approach to Jarring Analysis," SPE Drilling Engineering, Mar. 1990.

JarProTM—Drillstring Jarring Analysis Software, http://www.kalsi.com/software/iarpro.

Extended EP Search Report for EP Application No. 14901389.8 dated Jan. 2, 2018.

* cited by examiner

ACCELERATION PREDICTOR

FIELD OF INVENTION

The embodiments disclosed herein relate generally to the estimation of acceleration. In one or more embodiments, an estimator is preferably used in relation to a tool string, including but not limited to evaluation of drill strings, either down hole or on surface, which can be used to predict useful life of a component of the tool string.

BACKGROUND OF INVENTION

Tool string jarring analysis using stress-wave theory can provide accurate, fast, and simple-to-use method for optimization of jar placement in a tool string. This analysis offers the benefits of eliminating the need for large computational facilities, long solution times, and a high level of engineering expertise that are commonly associated with state-of-the-art transient dynamic finite-element methods (FEM). Previous methods have focused on predicting displacement, velocity, impact force, and duration.

DETAILED DESCRIPTION OF DISCLOSED EMBODIMENTS

As an initial matter, it will be appreciated that the development of an actual, real commercial application incorporating aspects of the disclosed embodiments will require many implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time.

While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

In the hydrocarbon exploration and production industry, "jarring" refers to the process of impacting a stuck downhole component with a large impulse force to try and free the component. The force is delivered using a mechanical device on the tool string called a "jar," which is basically two interlocking links that can be retracted or extended relative to each other (i.e., telescope). As the tool string is raised, stretching occurs and elastic potential energy builds up in the jar such that when the jar trips, a force or blow is delivered to the tool string. As mentioned above, jarring analysis using stress-wave theory can provide accurate, fast, and simple-to-use method for optimization of jar placement in a tool string. Embodiments of the invention are not limited to jarring applications, however, but may be used in any applications where step-wise discrete information about a tool or service is known and a smooth or interpolated property that is derived from this data is necessary. For example, embodiments of the invention may be used in logging/measurement while drilling (LWD)/(MWD) applications, wireline applications, coiled tubing applications, slick line applications, and the like.

The disclosed embodiments relate to a system and method that may be overlayed on existing software platforms. In one or more embodiments, this overlay may include a heat map capable of displaying where the high acceleration points are in the tool string via a single graphic that is color coded by user settable thresholds for acceleration. The heat map is general in that it can be used to display other information such as force, displacement, and other useful information to those skilled in the art.

The system can mimic the dynamics of a real system by filtering kinematic data. Obtaining kinematic data about a system is significantly faster and requires far less computational resources than solving for the dynamics of that system. The dynamics of most physical systems can be captured by second order oscillators, whose parameters are related to the physical properties, for example, stiffness. Finite element methods (FEM) use second order oscillators to model a complicated structure such as an airplane by slicing the structure into many small elements, associated as finite elements, which are then solved to get the approximate response of the structure.

The more elements that are used, the better the approximation of the structural dynamics. Typically thousands of elements are used to model structures such as tool strings.

In some embodiments, a tool acceleration estimator includes at least one digital filter wherein the digital filter is a second or higher order digital filter capable of calculating at least one acceleration estimate, and an acceleration heat map comprising each acceleration estimate. The estimator may also include an overlay, an acceleration heat map, at least one threshold, a scroll bar, visual indications such as color coding, or a maximum acceleration value for each tool string component section of the tool. Preferably, each heat map covers a range of drillstring components.

In some embodiments, a method of estimating tool acceleration includes the step of inputting velocity step changes into a digital smoothing filter to produce an acceleration estimate. The method may include producing a plurality of acceleration estimates, finding a maximum acceleration from the plurality of acceleration estimates, visually coding the maximum acceleration including color coding, displaying the visually coded maximum acceleration, generating a heat map correlated to the tool string component sections.

This present system and method of its use can be used to estimate acceleration. For example, consider the velocity profile shown in FIG. 1. This example shows a representative signature during jarring. Those skilled in the art will recognize that the values shown are illustrative and that variation is considered to be within the scope of the disclosed embodiments.

Figure 1:
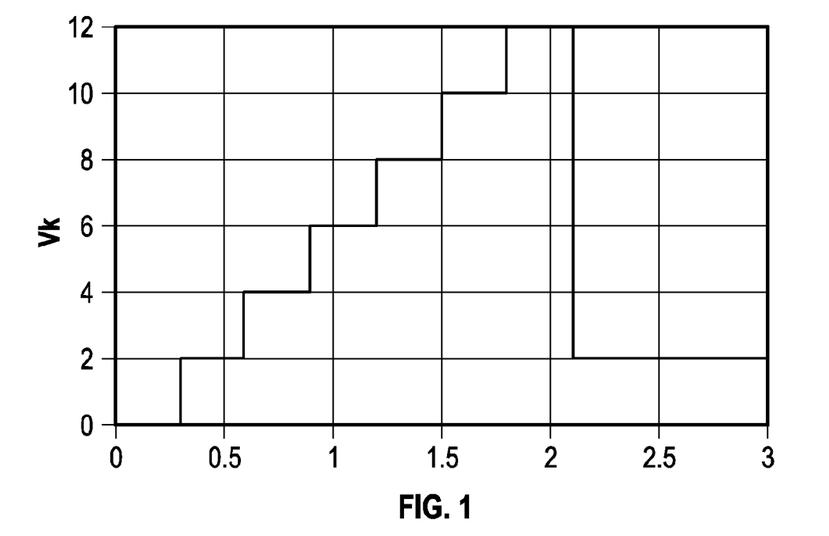
FIG. 1 is a representative graph showing examples of step change velocity.
Figure 2:
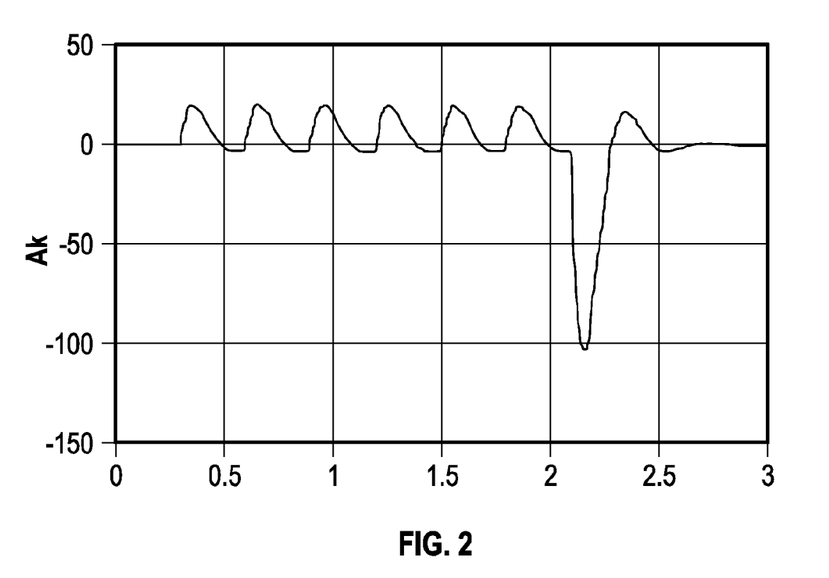
FIG. 2 is a representative graph showing digital acceleration filter output.

In FIG. 1, the large velocity drop after time 2 indicates a jarring event. The step change velocity time history is passed through a second order digital smoothing filter which produces the acceleration estimate shown in FIG. 2. The second order digital smoothing filter response is defined by its break frequency (in radians) w, damping ratio (unitless) z, and sampling period (in seconds). These parameters can be selected by the user to tune the transient response of the filter to match the tool string mechanical properties. For example, break frequency is related to tool string elastic bulk modulus, cross-sectional area, length, and mass, while damping ratio is a function of the material properties.

The disclosed embodiments do not rely on using a single digital smoothing filter for the entire tool string. Additional digital smoothing filters can be used to generate acceleration estimates for different tool string components if their material properties are significantly different from each other.

In general, higher order filters can also be used as they provide more degrees of freedom (filter coefficients) to tune the transient response of the digital smoothing filter to better match material properties. As used herein a digital smoothing filter is understood to mean at least one second or higher order smoothing filter. For example, a fourth order digital smoothing filter can be obtained by cascading two second order filters in series, which provide five degrees of freedom, such as sampling period, two break frequencies, and two damping ratios. Additionally, a first order low pass filter can be cascaded in series with the second order filters to provide additional tuning capability to shape the acceleration estimate.

Additionally, a second order digital smoothing filter can also be used to smooth out the step-change velocity time history. Other and/or additional digital smoothing filters may be used without departing from the scope of the disclosed embodiments.

Figure 3:
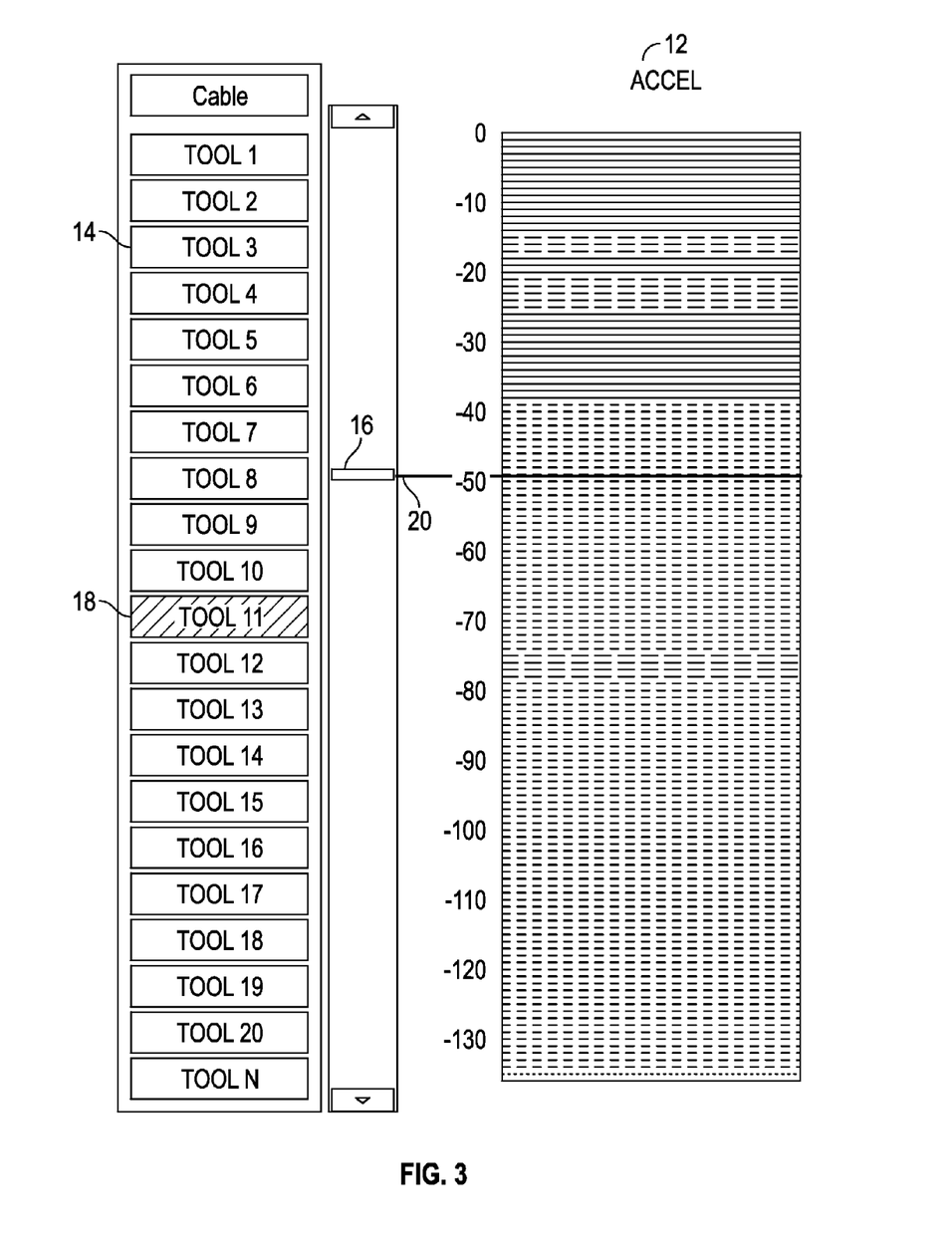
FIG. 3 is a representative interface showing embodiments of tool strings and heat maps.

As shown in FIG. 3, the disclosed embodiments may offer an overlay that uses the calculated acceleration to populate one or more heat maps. A heat map covers the entire range of drillstring components and correlates one-to-one with the tool string sections. A representative graphic illustrating an embodiment of the acceleration heat map 12 is shown in FIG. 3. In this embodiment, the maximum acceleration at the center of each tool string component is shown. However, there is no restriction to the location within a tool string component as to calculation of maximum acceleration that is being displayed. In FIG. 3, the tool string components sections 14 are shown in the left. The tool string components sections 14 reside in a database which is used to assemble the tool string of interest. Adjacent to the tool string components section 14 is a scroll-bar 16 that is used to navigate up and down among the tool string components section 14 in order to display the maximum acceleration in each component based on the acceleration heat map 12. As shown, the section 18 called "TOOL 11" is highlighted by the location of the scroll bar that shows the acceleration heat map 12.

Figure 4:
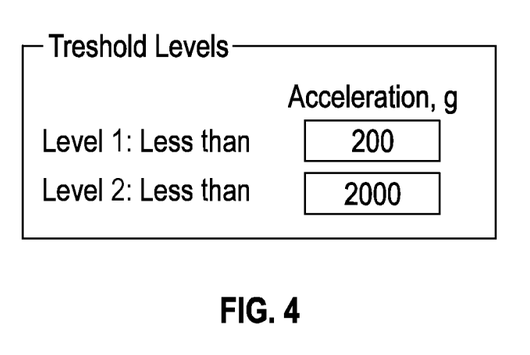
FIG. 4 is a representative interface showing threshold levels.

Exemplary thresholds for use in the heat maps are shown in FIG. 4, which is a graphic illustrating the heat map concept. It should be understood that different threshold values besides the ones shown here may also be used. In the example, the maximum acceleration at the center of each tool string component is shown. However, there is no restriction to the location within a tool string component as to calculation of maximum acceleration that is being displayed.

Figure 5:
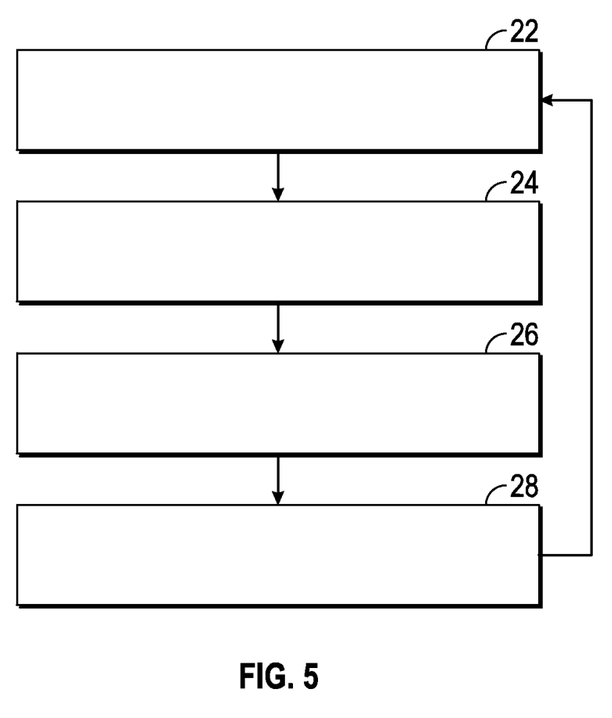
FIG. 5 is a flow chart showing digital filter implementation.

FIG. 5 shows a flow chart for a digital smoothing filter. Stress wave software can generate a step change in Step 22 for each tool string component and location within the component. Input stress-wave generates step-change velocity time history, which is stored in a buffer in Step 24. Loop over buffered step-change velocity data with signal smoothing filter to produce acceleration estimate is performed in Step 26. The acceleration estimate time history is saved in a buffer in Step 28.

Figure 6:
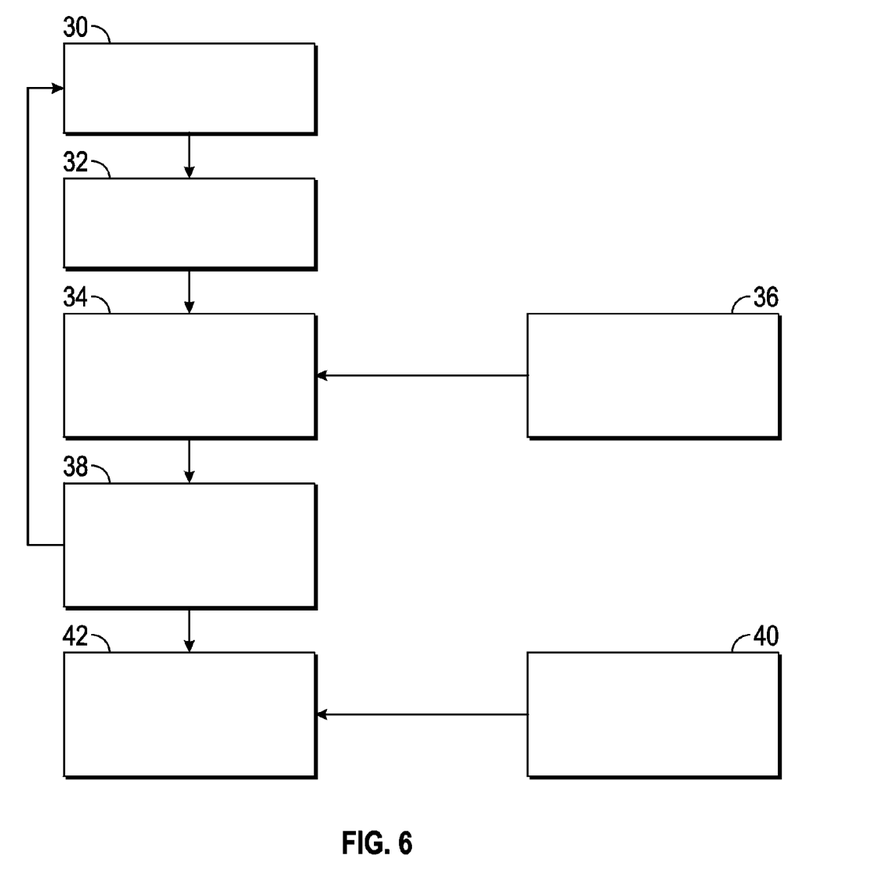
FIG. 6 is a flow chart showing an embodiment of the implementation.

FIG. 6 shows a flow chart for one or more implementations. Step 30 related to for each acceleration time history for each tool string component, and for each location within each component. In Step 32, a search is made over the acceleration time history data points and a maximum absolute value of acceleration is selected. In Step 34, the maximum acceleration values is converted to a color code based on user defined threshold values, which are provided via Step 36. In Step 38, tool string component indexes, component location indexes, and maximum acceleration are saved in the buffer. In Step 42, a correlated tool string component section graphic, scroll bar, and heat map is generated for each location with a tool string component using information from the tool string component section database, provided in Step 40, which contains indexed name list for the tool string components being used.

Figure 7:
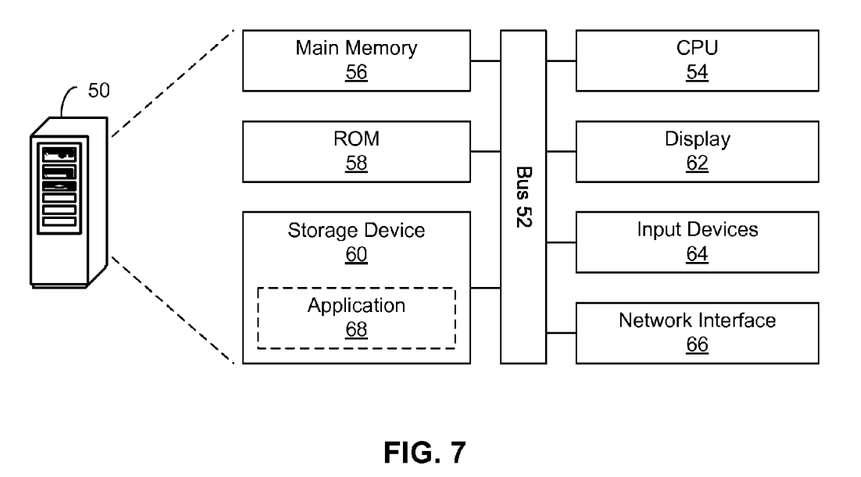
FIG. 7 is a system that may be used to implement the various embodiments disclosed herein.

FIG. 7 illustrates a system 50 that may be used to implement some or all of the acceleration predictor embodiments disclosed herein. Such a system 50 may be a conventional workstation, desktop, or laptop computer, or it may be more like a mobile or handheld system, or it may be a custom-developed system. In the example shown, the system 50 may include a bus 52 or other communication mechanism for transferring information within the system 50, and a CPU 54 coupled with the bus 52 for processing the information. The system 50 may also include a main memory 56, such as a random access memory (RAM) or other dynamic storage device coupled to the bus 52 for storing computer-readable instructions to be executed by the CPU 54. The main memory 56 may also be used for storing temporary variables or other intermediate information during execution of the instructions to be executed by the CPU 54. The system 50 may further include a read-only memory (ROM) 58 or other static storage device coupled to the bus 52 for storing static information and instructions for the CPU 54. A computer-readable storage device 60, such as a Flash drive or magnetic disk, may be coupled to the bus 52 for storing information and instructions for the CPU 54.

The term "computer-readable instructions" as used above refers to any instructions that may be performed by the CPU 54 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 60. Volatile media may include dynamic memory, such as main memory 56. Transmission media may include coaxial cables, copper wire and fiber optics, including wires of the bus 52. Transmission itself may take the form of electromagnetic, acoustic or light waves, such as those generated during radio frequency (RF) and infrared (IR) data communications. Common forms of computer-readable media may include, for example, a floppy disk, a flexible disk, hard disk, magnetic tape, other magnetic medium, a CD ROM, DVD, other optical medium, a RAM, a PROM, an EPROM, a FLASH EPROM, other memory chip or cartridge, or any other medium from which a computer can read.

The CPU 54 may also be coupled via the bus 52 to a display 62 for displaying information to a user. One or more input devices 64, including alphanumeric and other keyboards, mouse, trackball, cursor direction keys, and so forth, may be coupled to the bus 52 for communicating information and command selections to the CPU 54. A communications interface 66 may be provided for allowing the system 50 to communicate with an external system or network.

In accordance with the disclosed embodiments, an acceleration predictor application 68, or rather the computer-readable instructions therefor, may also reside on or be downloaded to the storage device 60. The acceleration predictor application substantially embodies the concepts and principles of the disclosed embodiments in the form of a specific software application developed using a particular programming language. Such a software application may then be executed by the CPU 54 and/or other components of the system 50. Any suitable programming language known to those having ordinary skill in the art may be used to implement the application 68, and the application may be developed in any suitable application development environment known to those having ordinary skill in the art.

Thus, in general, in one aspect, the disclosed embodiments relate to a computer-based system for predicting acceleration for a downhole tool string. The system includes a central processing unit mounted within the computer-based system, a display electrically connected to the central processing unit and configured to display images from the central processing unit, and a storage device electrically connected to the central processing unit. The storage device stores at least one digital smoothing filter executable by the central processing unit to calculate at least one acceleration estimate for the downhole tool string. In one or more embodiments, the system may include an overlay, an acceleration heat map, at least one threshold, wherein each acceleration heat map covers a range of a plurality of tool string components, a scroll bar, visual indications that may be color coded, and/or a maximum acceleration value.

In general, in another aspect, the disclosed embodiments relate to a method of predicting acceleration. The method comprises the step of calculating an acceleration estimate from a plurality of discrete velocity inputs by using at least one digital smoothing filter, and smoothing the velocity inputs to generate a smoothed velocity. In one or more embodiments, the calculation of the acceleration estimate may include finding a maximum acceleration from a plurality of the acceleration estimates, visually coding at least one point on a heat map that may include color coding, displaying a visually coded maximum acceleration, and/or generating a heat map correlated to a plurality of tool string component sections. In one or more of the above embodiments, the at least one digital filter is a second or higher order digital filter.

In general, in yet another aspect, the disclosed embodiments relate to an acceleration predictor tool for a downhole tool string. The acceleration predicted tool comprises at least one digital smoothing filter configured for calculation of at least one acceleration estimate for the downhole tool string, an acceleration heat map configured to indicate where high acceleration points are in the tool string, and at least one acceleration threshold level for the heat map. The acceleration heat map covers a range of tool string components and correlates one-to-one with sections of the tool string. In one or more embodiments, the digital smoothing filter is a second or higher order smoothing filter, and/or the at least one threshold level is a user settable threshold level. In one or more of the above embodiments, the downhole tool string supports one or more of: a logging while drilling application, a measurement while drilling application, a wireline application, a coiled tubing application, and a slick line application.

Therefore, the disclosed embodiments are well adapted to attain the ends and advantages mentioned as well as those that are inherent therein. The particular embodiments disclosed above are illustrative only, as the invention may be modified and practiced in different but equivalent manners apparent to those skilled in the art having the benefit of the teachings herein.

Furthermore, no limitations are intended regarding the details of construction or design herein shown, other than as described in the claims below. It is therefore evident that the particular illustrative embodiments disclosed above may be altered, combined, or modified and all such variations are considered within the scope and spirit of the invention. As such, the invention illustratively disclosed herein suitably may be practiced in the absence of any element that is not specifically disclosed herein and/or any optional element disclosed herein.

Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

While the disclosed embodiments have been described with reference to one or more particular implementations, those skilled in the art will recognize that many changes may be made thereto without departing from the spirit and scope of the description. Accordingly, each of these embodiments and obvious variations thereof is contemplated as falling within the spirit and scope of the claimed invention, which is set forth in the following claims.

What is claimed is:

1. A computer-based system of predicting acceleration for a downhole tool string, comprising:
 a central processing unit mounted within the computer-based system;
 a display electrically connected to the central processing unit and configured to display images from the central processing unit; and
 a storage device electrically connected to the central processing unit, the storage device storing therein an overlay and at least one digital smoothing filter executable by the central processing unit to calculate at least one acceleration estimate for the downhole tool string.

2. The system of claim 1 wherein the storage device further stores an acceleration heat map.

3. The system of claim 2 wherein the storage device further stores at least one acceleration threshold.

4. The system of claim 2 wherein each acceleration heat map covers a range of a plurality of tool string components.

5. The system of claim 2 wherein the storage device further stores a scroll bar.

6. The system of claim 2 wherein the overlay comprises visual indications.

7. The system of claim 6 wherein the visual indications are color coded.

8. The system claim 1 wherein the storage device further stores a maximum acceleration value.

9. A method of predicting acceleration comprising the steps of:
- calculating an acceleration estimate from a plurality of discrete velocity inputs by using at least one digital smoothing filter;
- smoothing the velocity inputs to generate a smoothed velocity; and
- finding a maximum acceleration from a plurality of the acceleration estimates.

10. The method of claim 9 further comprising visually coding at least one point on a heat map.

11. The method of claim 10 wherein visually coding the at least one point on a heat map comprises color coding.

12. The method of claim 10 further comprising displaying a visually coded maximum acceleration.

13. The method of claim 12 further comprising generating a heat map correlated to a plurality of tool string component sections.

14. The method of claim 9 wherein the at least one digital smoothing filter is a second or higher order digital smoothing filter.

15. An acceleration predictor tool for a downhole tool string comprising:
- at least one digital smoothing filter configured for calculation of at least one acceleration estimate for the downhole tool string;
- an acceleration heat map that indicates where high acceleration points are in the tool string; and
- at least one acceleration threshold level for the heat map;
- wherein the acceleration heat map covers a range of tool string components and correlates one-to-one with sections of the tool string.

16. The acceleration predictor tool of claim 15 wherein the digital smoothing filter is a second or higher order smoothing filter.

17. The acceleration predictor tool of claim 16 wherein the at least one threshold level is a user settable threshold level.

18. The acceleration predictor tool of claim 15 wherein the downhole tool string supports one or more of: a logging while drilling application, a measurement while drilling application, a wireline application, a coiled tubing application, and a slick line application.

* * * * *